United States Patent
Hur et al.

(10) Patent No.: US 11,412,291 B2
(45) Date of Patent: Aug. 9, 2022

(54) ELECTRONIC DEVICE AND CONTROL METHOD THEREOF

(71) Applicant: SAMSUNG ELECTRONICS CO., LTD., Suwon-si (KR)

(72) Inventors: Jaemyung Hur, Suwon-si (KR); Kyoungshin Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/143,395

(22) Filed: Jan. 7, 2021

(65) Prior Publication Data
US 2021/0250640 A1    Aug. 12, 2021

(30) Foreign Application Priority Data

Feb. 6, 2020 (KR) .................. 10-2020-0014262

(51) Int. Cl.
| | | |
|---|---|---|
| *H04N 21/439* | (2011.01) | |
| *G06F 21/62* | (2013.01) | |
| *G10L 15/22* | (2006.01) | |
| *H04N 21/422* | (2011.01) | |

(52) U.S. Cl.
CPC ....... *H04N 21/439* (2013.01); *G06F 21/6245* (2013.01); *G10L 15/22* (2013.01); *H04N 21/42203* (2013.01)

(58) Field of Classification Search
CPC .......... H04N 21/439; H04N 21/42203; H04N 21/4852; H04N 21/4398; H03G 3/32; G10L 15/22; G06F 21/6245
See application file for complete search history.

(56) References Cited

U.S. PATENT DOCUMENTS

| | | | | |
|---|---|---|---|---|
| 7,047,191 B2* | 5/2006 | Lange | ............. | G10L 15/005 |
| | | | | 348/468 |
| 7,065,524 B1* | 6/2006 | Lee | ............. | G06Q 30/02 |
| 7,092,888 B1* | 8/2006 | McCarthy | ............. | G10L 15/063 |
| | | | | 379/88.01 |
| 7,509,385 B1* | 3/2009 | Rittmeyer | ............. | G06Q 10/107 |
| | | | | 709/206 |
| 7,729,917 B2* | 6/2010 | Miyamoto | ............. | G10L 15/22 |
| | | | | 704/270 |
| 7,739,253 B1* | 6/2010 | Yanovsky | ............. | G06F 16/9535 |
| | | | | 707/705 |
| 7,801,910 B2* | 9/2010 | Houh | ............. | G06F 16/745 |
| | | | | 707/765 |

(Continued)

FOREIGN PATENT DOCUMENTS

KR    10-2019-0106902    9/2019

OTHER PUBLICATIONS

International Search Report and Written Opinion dated Apr. 27, 2021 in corresponding International Application Mo. PCT/KR2020/019311.

*Primary Examiner* — Michael B. Pierorazio
(74) *Attorney, Agent, or Firm* — Nixon & Vanderhye P.C.

(57) ABSTRACT

Disclosed is an electronic device capable of acquiring a second signal obtained by converting a time characteristic of a first signal received through a microphone based on a value defined corresponding to a voice, acquiring information on a surrounding environment based on a frequency characteristic of the acquired second signal, and adjusting an audio characteristic of content based on the acquired information on the surrounding environment.

20 Claims, 11 Drawing Sheets

(56) References Cited

U.S. PATENT DOCUMENTS

| | | | |
|---|---|---|---|
| 7,873,654 B2* | 1/2011 | Bernard | G06F 16/3329 707/769 |
| 7,962,331 B2* | 6/2011 | Miller | G10L 15/01 704/215 |
| 8,121,432 B2* | 2/2012 | Dorai | G06F 16/7834 382/276 |
| 8,131,545 B1* | 3/2012 | Moreno | G10L 15/04 704/235 |
| 8,423,363 B2* | 4/2013 | Gupta | G10L 15/22 704/255 |
| 8,572,488 B2* | 10/2013 | Phillips | G06F 16/4393 715/716 |
| 8,700,406 B2 | 4/2014 | Grokop et al. | |
| 9,053,710 B1* | 6/2015 | Zehr | H03G 5/165 |
| 2004/0096110 A1* | 5/2004 | Yogeshwar | G06F 16/51 382/239 |
| 2005/0227614 A1* | 10/2005 | Hosking | H04N 7/165 455/3.06 |
| 2006/0015339 A1* | 1/2006 | Charlesworth | G10L 15/187 704/251 |
| 2007/0124147 A1* | 5/2007 | Gopinath | G10L 15/19 704/257 |
| 2007/0124788 A1* | 5/2007 | Wittkoter | H04N 21/8133 725/112 |
| 2007/0214164 A1* | 9/2007 | MacLennan | G06F 16/90 |
| 2008/0066138 A1* | 3/2008 | Bishop | H04N 21/4884 725/137 |
| 2008/0255844 A1* | 10/2008 | Wu | G10L 15/193 704/255 |
| 2008/0266449 A1* | 10/2008 | Rathod | H04N 21/8405 348/468 |
| 2008/0270134 A1* | 10/2008 | Miyamoto | G10L 15/26 704/251 |
| 2009/0112592 A1* | 4/2009 | Candelore | H04N 21/42204 704/246 |
| 2009/0171662 A1* | 7/2009 | Huang | G10L 15/1822 704/251 |
| 2010/0091187 A1* | 4/2010 | Topiwalla | H04N 21/4858 348/468 |
| 2010/0162294 A1* | 6/2010 | Yin | H04N 21/4751 725/30 |
| 2011/0022386 A1* | 1/2011 | Gatzke | G10L 15/26 704/235 |
| 2011/0040559 A1* | 2/2011 | Kim | G10L 21/055 704/231 |
| 2012/0016678 A1* | 1/2012 | Gruber | G10L 15/183 704/275 |
| 2012/0101817 A1* | 4/2012 | Mocenigo | G10L 15/063 704/231 |
| 2012/0253799 A1* | 10/2012 | Bangalore | G10L 15/183 704/231 |
| 2012/0310640 A1 | 12/2012 | Kwatra et al. | |
| 2014/0044275 A1 | 2/2014 | Goldstein et al. | |
| 2015/0088495 A1 | 3/2015 | Jeong et al. | |
| 2018/0301140 A1* | 10/2018 | Turcott | G09B 21/004 |
| 2019/0131948 A1 | 5/2019 | Cho et al. | |
| 2019/0179600 A1 | 6/2019 | An | |
| 2021/0065697 A1 | 3/2021 | Kim | |

* cited by examiner

ELECTRONIC DEVICE AND CONTROL METHOD THEREOF

CROSS-REFERENCE TO RELATED APPLICATION

This application is based on and claims priority under 35 U.S.C. § 119 to Korean Patent Application No. 10-2020-0014262, filed on Feb. 6, 2020, the disclosure of which is incorporated by reference herein in its entirety.

BACKGROUND

1. Field

The disclosure relates to an electronic device and a control method thereof, and for example, to an electronic device that acquires information on surrounding environment based on a signal received from a microphone, and a control method thereof.

2. Discussion of Related Art

Recently released electronic devices may improve listening environment through a microphone. For example, a TV may detect various sounds affecting listening environment from moment to moment through the so-called always-on function which keeps the microphone on, and adjust an audio characteristic based on the detected sound, thereby creating the better listening environment.

In this way, the electronic device has the advantage of improving the listening environment using the sound received through the microphone, but there is also a disadvantage that personal information may be leaked as it is when the corresponding sound is hacked. The personal information thus extracted may be used for various financial scams such as phishing, pharming, and smishing, and is often involved in financial crimes.

Accordingly, there is a need for security processing capable of improving the listening environment using sound received through a microphone and preventing significant personal information from being acquired from the sound even if the sound is hacked.

SUMMARY

Embodiments of the disclosure provide an electronic device performing security processing on a sound signal received through a microphone to improve listening environment based on the sound signal, and to prevent and/or reduce significant personal information from being extracted from the sound signal, and a control method thereof.

According to an example embodiment of the disclosure, an electronic device includes: a processor configured to: acquire a second signal obtained by converting a time characteristic of a first signal received through a microphone based on a value defined corresponding to a voice, acquire information on surrounding environment based on a frequency characteristic of the acquired second signal, and adjust an audio characteristic of content based on the acquired information on the surrounding environment.

The processor may acquire the second signal segmented from the first signal based on a time corresponding to recognition restriction of the user voice.

The processor may acquire the second signal by combining the first signal and a third signal generated according to the time corresponding to the recognition restriction.

The time corresponding to the recognition restriction may include at least one of a cycle or a time width, and the processor may adjust at least one of a cycle or a time width of the third signal.

The processor may control the electronic device to output a sound for measuring the surrounding environment through a speaker, and receive the first signal through the microphone in response to the output of the sound.

The sound may have a frequency higher than an audible frequency.

The processor may acquire the information on the surrounding environment based on a acquired peak value for each frequency band of the acquired second signal.

The processor may perform speech recognition on the second signal based on a time corresponding to the recognition restriction.

According to an example embodiment of the disclosure, a method of controlling an electronic device includes: acquiring a second signal obtained by converting a time characteristic of a first signal received through a microphone based on a value defined corresponding to a voice; acquiring information on surrounding environment based on a frequency characteristic of the acquired second signal; and adjusting an audio characteristic of content based on the acquired information on the surrounding environment.

The acquiring of the second signal may include acquiring the second signal segmented from the first signal based on a time corresponding to recognition restriction of the user voice.

The acquiring of the second signal segmented from the first signal may include acquiring the second signal by combining the first signal and a third signal generated according to the time corresponding to the recognition restriction.

The time corresponding to the recognition restriction may include at least one of a cycle or a time width, and the acquiring of the second signal segmented from the first signal may include adjusting at least one of a cycle or a time width of the third signal.

The method of controlling an electronic device may further include: outputting a sound for measuring the surrounding environment through a speaker; and receiving the first signal through the microphone in response to the output of the sound.

The sound may have a frequency higher than the audible frequency.

The acquiring of the information on the surrounding environment may include acquiring the information on the surrounding environment based on a peak value for each frequency band of the acquired second signal.

The method of controlling an electronic device may further include performing speech recognition on the second signal based on the time corresponding to the recognition restriction.

According to an example embodiment of the disclosure, a non-transitory computer-readable recording medium is provided, having stored thereon a computer program including a code that, when executed by a processor of an electronic device, causes the electronic device to perform at least one operation including: acquiring a second signal obtained by converting a time characteristic of a first signal received through a microphone based on a value defined corresponding to a user voice; acquiring information on surrounding environment based on a frequency characteristic of the acquired second signal; and adjusting an audio characteristic of content based on the acquired information on the surrounding environment.

According to the disclosure, it is possible to provide the electronic device performing the security processing on the sound signal received through the microphone not only to improve the listening environment based on the sound signal, but also to prevent and/or reduce significant personal information from being extracted from the sound signal, and the control method thereof.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
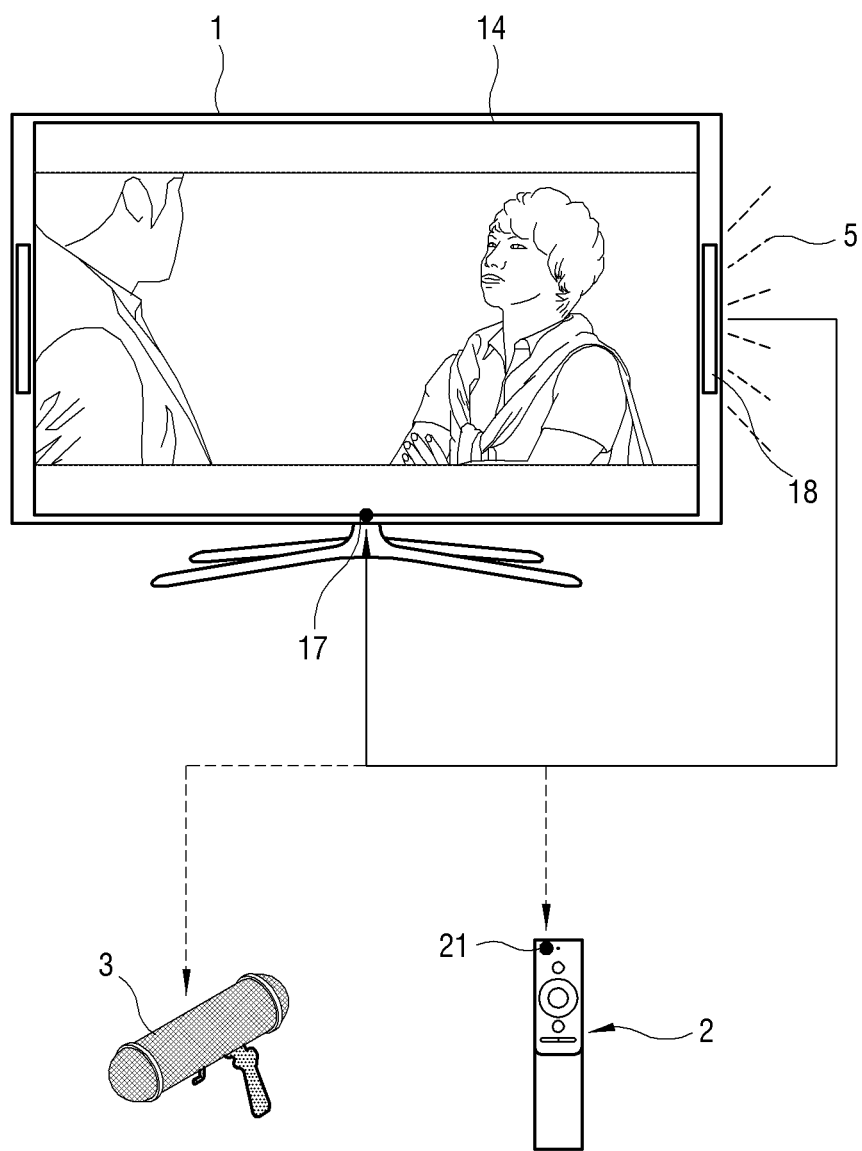
FIG. 1 is a diagram illustrating an example electronic device according to various embodiments.

Hereinafter, various example embodiments of the disclosure will be described in greater detail with reference to the accompanying drawings. The description of the various example embodiments below references matters described in the accompanying drawings, and the same reference numerals or symbols illustrated in each drawing indicate components that perform substantially the same operation. In the disclosure, at least one of a plurality of elements refers to not only all of the plurality of components, but also each one or all combinations thereof excluding the rest of the plurality of components.

FIG. 1 is a diagram illustrating an example electronic device various embodiments.

As illustrated in FIG. 1, an electronic device 1 may include a display 14. The electronic device 1 may display an image of content through the display 14 based on a video signal of the content. The electronic device 1 may be implemented as various types of devices such as image display devices such as a TV, a smartphone, a tablet, a portable media player, a wearable device, a video wall, an electronic frame, or the like, video processing devices such as a set-top box without a display 14, household appliances such as a refrigerator and a washing machine, information processing devices, or the like, such as a computer body.

When the electronic device 1 does not include the display 14, the video signal of the content may be transmitted to an external TV. In addition, the electronic device 1 may be implemented as an artificial intelligence speaker, an artificial intelligence robot, or the like which is equipped with an artificial intelligence function. However, the type of the electronic device 1 is not limited thereto, but hereinafter, for convenience of description, it is assumed that the electronic device 1 is implemented as a TV.

The electronic device 1 may include a speaker 18. The electronic device 1 may output audio 5 of content through the speaker 18 based on an audio signal of the content. The audio signal of the content may be received from an external device. Here, the external device is a content providing device, and may include not only a broadcasting station, but also a smartphone, a tablet, a portable media player, a portable storage medium, a wearable device, and the like. However, the audio signal is not limited to one received from the external device, and therefore may be one stored in the electronic device 1.

The electronic device 1 may include a microphone 17. The electronic device 1 may receive various types of sounds through the microphone 17. For example, sound output from the outside, for example, uttered voice from a user, noise of surrounding environment, sound and the like may be received through the microphone 17. In addition, the sound output by itself, such as the sound output from the speaker 18 may be received through the microphone 17. The electronic device 1 may receive sound through an external microphone such as an external microphone 3 and a microphone 21 of a remote control 2 as well as the microphone 17 built therein. When the external microphone receives sound, the electronic device 1 may receive a sound signal from the external microphone.

Figure 2:
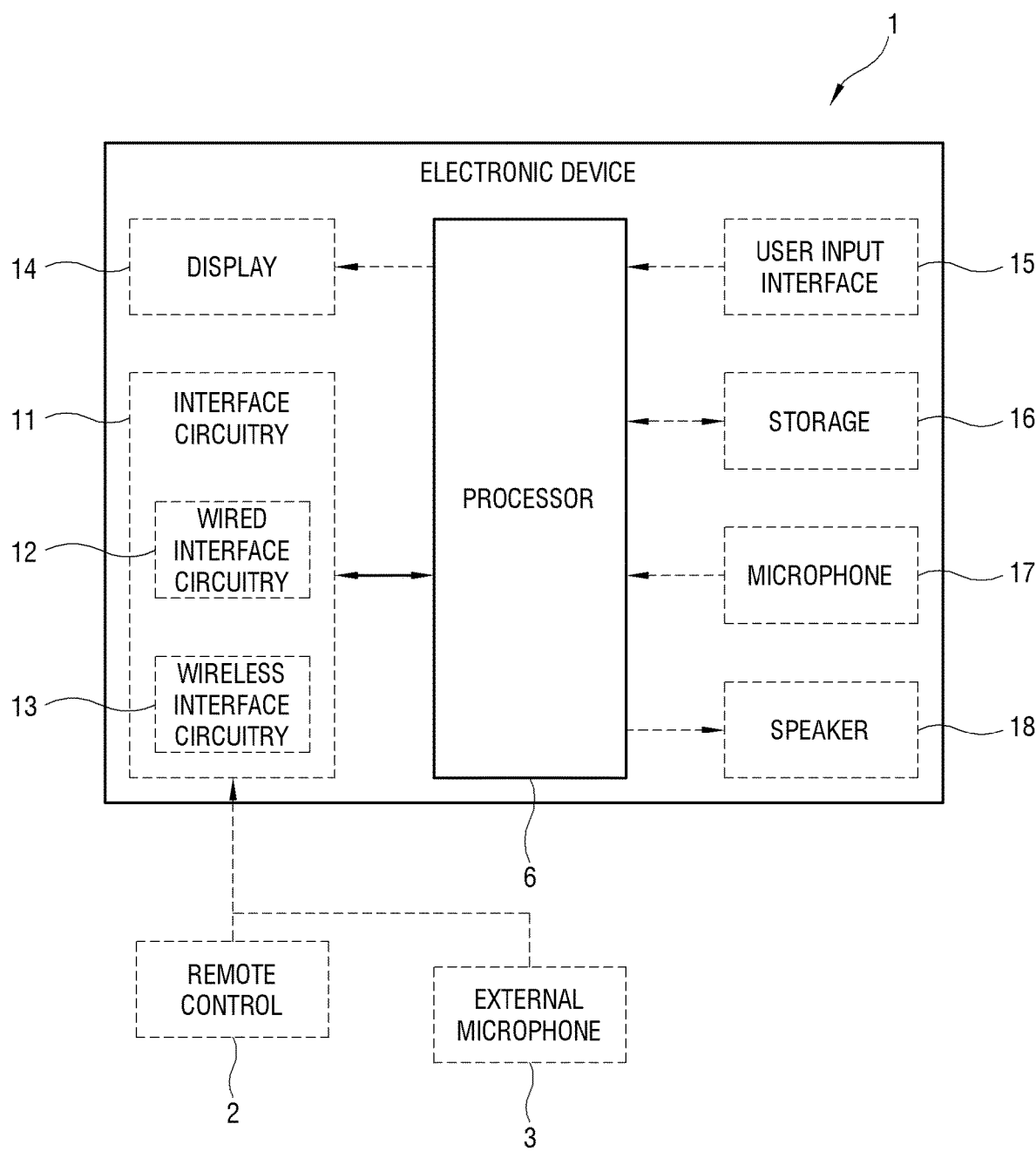
FIG. 2 is a block diagram illustrating an example configuration of the electronic device of FIG. 1 according to various embodiments.

FIG. 2 is a block diagram illustrating an example configuration of the electronic device of FIG. 1 according to various embodiments.

Hereinafter, the configuration of the electronic device 1 will be described in greater detail with reference to FIG. 2. Although this non-limiting example describes the case where the electronic device 1 is a TV, the electronic device 1 may be implemented as various types of devices, and therefore the present embodiment does not limit the configuration of the electronic device 1. The electronic device 1 may not be implemented as a display device such as a TV. In this case, the electronic device 1 may not include components for displaying an image, such as the display 14. For example, when the electronic device 1 is implemented as a set-top box, the electronic device 1 may output a video signal to an external TV through an interface circuitry 11.

The electronic device 1 includes the interface circuitry 11. The interface circuitry 11 may include a wired interface circuitry 12. The wired interface circuitry 12 includes a connector or port through which an antenna capable of receiving broadcast signals according to broadcast standards such as terrestrial and satellite broadcasting may be connected, or a cable capable of receiving broadcast signals according to cable broadcasting standards may be connected. As another example, the electronic device 1 may incorporate an antenna capable of receiving a broadcast signal. The wired interface circuitry 12 may include a connector, a port, or the like according to video and/or audio transmission standards, such as an HDMI port, DisplayPort, a DVI port, thunderbolt, composite video, component video, super video, and SCART. The wired interface circuitry 12 may include a connector, a port, or the like according to a universal data transmission standard such as a USB port. The wired interface circuitry 12 may include a connector, a port, or the like to which an optical cable may be connected according to an optical transmission standard. The wired interface circuitry 12 is connected to an external microphone or an external audio device having a microphone, and may include a connector or a port capable of receiving or inputting an audio signal from an audio device. The wired interface circuitry 12 is connected to an audio device such as a headset, an earphone, and an external speaker, and may include a connector, a port, or the like capable of transmitting or outputting an audio signal to the audio device. The wired interface circuitry 12 may include a connector or a port according to a network transmission standard such as the Ethernet. For example, the wired interface circuitry 12 may be implemented as a LAN card or the like which is wired to a router or a gateway.

The wired interface circuitry 12 may be wired to a set-top box, an external device such as an optical media playback device, an external display device, a speaker, a server, or the like through the connector or the port in a 1:1 or 1:N (N is a natural number) manner to receive video/audio signals from the corresponding external device or transmit the video/audio signals to the corresponding external device. The wired interface circuitry 12 may include a connector or a port for separately transmitting video/audio signals.

According to an embodiment, the wired interface circuitry 12 may be built in the electronic device 1, but may be implemented in the form of a dongle or a module and detached from the connector of the electronic device 1.

The interface circuitry 11 may include a wireless interface circuitry 13. The wireless interface circuitry 13 may be implemented in various ways corresponding to the implementation type of the electronic device 1. For example, the wireless interface circuitry 13 may use wireless communications such as radio frequency (RF), Zigbee, Bluetooth, Wi-Fi, ultra wideband (UWB), and near field communication (NFC) as a communication method. The wireless interface circuitry 13 may be implemented as a wireless communication module that performs wireless communication with an AP according to a Wi-Fi method, a wireless communication module that performs one-to-one direct wireless communication such as Bluetooth, or the like. The wireless interface circuitry 13 may wirelessly communicate with a server on a network to transmit and receive a data packet to and from at least one server. The wireless interface circuitry 13 may include an IR transmitter and/or an IR receiver capable of transmitting and/or receiving an infrared (IR) signal according to an infrared communication standard. The wireless interface circuitry 13 may receive or input a remote control signal from the remote control 2 or other external devices through the IR transmitter and/or the IR receiver, or transmit or output the remote control signal to the remote control 2 or other external devices. As another example, the electronic device 1 may transmit and receive the remote control signal to and from the remote control 2 or other external devices through the wireless interface circuitry 13 of other methods such as Wi-Fi or Bluetooth.

The electronic device 1 may further include a tuner for tuning the received broadcast signal for each channel when the video/audio signal received through the interface circuitry 11 is a broadcast signal.

The electronic device 1 includes the display 14. The display 14 includes a display panel that may display an image on a screen. The display panel may be provided as a light-receiving structure such as a liquid crystal type or a self-luminous structure such as an OLED type. The display 14 may further include additional components according to the structure of the display panel. For example, if the display panel is a liquid crystal type, the display 14 includes a liquid crystal display panel, a backlight unit that supplies light, and a panel driving substrate that drives a liquid crystal of the liquid crystal display panel. However, the display 14 may be omitted when the electronic device 1 is implemented as a set-top box and the like.

The electronic device 1 includes a user input interface (e.g., including input interface circuitry) 15. The user input interface 15 includes various types of input interface related circuits that are provided to be manipulated by a user in order to perform user input. The user input interface 15 may be configured in various forms according to the type of the electronic device 1, and the user input interface 34 includes, for example, a mechanical or electronic button unit of the electronic device 1, a touch pad, a touch screen installed on the display 14, and the like.

The electronic device 1 includes a storage 16. The storage 16 stores digitized data. The storage 16 includes a nonvolatile storage that may preserve data regardless of whether the nonvolatile storage is supplied with power, and a volatile memory that may be loaded with data processed by a processor 6 and may not preserve data when the volatile memory is not supplied with power. The storage includes a flash-memory, a hard-disc drive (HDD), a solid-state drive (SSD), a read-only memory (ROM), and the like, and the memory includes a buffer, a random access memory (RAM), and the like.

The electronic device 1 includes the microphone 17. The microphone 17 may receive various types of sounds, such as uttered voice from a user, noise from the surrounding environment, and sound. In addition, the microphone 17 may receive sound output from the speaker 18. The microphone 17 may transmit the received sound signal to the processor 6.

The microphone 17 may be implemented as an internal microphone provided in the body of the electronic device 1. In addition, the microphone 17 may be implemented as an external microphone provided outside the electronic device 1. The external microphone may be a standalone device or a component of other electronic devices. For example, the external microphone may be installed on the remote control 2 separated from the body of the electronic device 1, the smartphone, or the like. In this case, a sound signal collected through the external microphone provided in the remote control 2, the smartphone, or the like may be digitized and received through the interface circuitry 11.

The electronic device 1 includes the speaker 18. The speaker 18 may output sound based on various types of sound signals. The speaker 18 may be implemented as at least one speaker. The speaker 18 may be installed on the electronic device 1 or may be implemented as an external speaker provided outside. In this case, the electronic device 1 may transmit a sound signal to an external speaker through the interface circuitry 11.

The electronic device 1 includes the processor (e.g., including processing circuitry) 6. The processor 6 includes various processing circuitry, including, for example, one or more hardware processors implemented as a CPU, a dedicated processor, a chipset, a buffer, a circuit, and the like that are mounted on a printed circuit board, and may be implemented as a system on chip (SOC) depending on the design method.

When the electronic device 1 is implemented as a display device, the processor 6 may include a video signal processor for performing video processing on a video signal of content. The video signal processor may include a demultiplexer, a decoder, and a scaler, and may be implemented as a video processing processor. The processor 6 may include an audio signal processor for performing audio processing on an audio signal. The audio signal processor may be implemented as an audio processing processor, and may include an audio digital signal processor (DSP), an amplifier, and the like.

However, since the processor 6 is not limited to being provided to include the video processing processor and the audio processing processor, depending on the design method, the video processing processor or the audio processing processor may be provided in a separate configuration from the processor 6.

The processor 6 may include modules corresponding to various processing processors described above. Some or all of these modules may be implemented as SOC. For example, a module related to vide processing such as a demultiplexer, a decoder, and a scaler may be implemented as a video processing SOC, and an audio DSP may be implemented as a separate chipset from the SOC.

However, since the configuration of the electronic device 1 is not limited to that illustrated in FIG. 2, some of the above-described configurations may be excluded, or the configurations other than the above configuration may be included according to the design method.

For example, the electronic device 1 may include a sensor unit. The sensor unit may include at least one sensor that identifies a user or detects a user's movement, location, or the like. The sensor unit may further include an image acquisition unit that captures or photographs a front surface of the electronic device 1, and may identify a user based on an image acquired through the image acquisition unit, or detect the user's movement, location, or the like. The image acquisition unit may be implemented as at least one camera. However, since the disclosure is not limited thereto, the sensor unit may include a distance sensor for detecting the user's movement, location, or the like. The distance sensor may emit, for example, infrared rays, ultrasonic waves, and the like, and measure the user's movement, location, and the like based on the difference between the time when the infrared rays, the ultrasonic waves, and the like are emitted and the time when the infrared rays, the ultrasonic waves, and the like are reflected by the user and the like and returned.

The processor 6 of the electronic device 1 may perform an operation of acquiring the second signal obtained by converting the time characteristic of the first signal received through the microphone 17 based on a value defined corresponding to the user voice, an operation of acquiring information on surrounding environment based on a frequency characteristic of the acquired second signal, and an operation of adjusting an audio characteristic of content based on the acquired information on the surrounding environment. The processor 6 may perform at least a part of data analysis, processing, and generation of result information for performing each operation using at least one of machine learning, a neural network, or a deep learning algorithm as a rule-based or artificial intelligence algorithm.

For example, the processor 6 may perform functions of a learning unit and a recognition unit together. The learning unit may perform a function of generating a trained neural network, and the recognition unit may perform a function of recognizing (or reasoning, predicting, estimating, and determining) data using the trained neural network. The learning unit may generate or update the neural network. The learning unit may obtain learning data to generate the neural network. For example, the learning unit may obtain the learning data from the storage 16 or the server storage or from the outside. The learning data may include data used for training the neural network, and the neural network may be trained using the data performing the above-described operation as the learning data.

Before learning the neural network using the learning data, the learning unit may perform a pre-processing operation on the obtained learning data, or select data to be used for learning from among a plurality of learning data. For example, the learning unit may process or filter the learning data in a predetermined format, or add/remove noise to process data in a form suitable for training. The learning unit may generate a neural network configured to perform the above-described operation using the pre-processed learning data.

The learned neural network may include a plurality of neural networks (or layers). Nodes of the plurality of neural networks have weights, and the plurality of neural networks may be connected to each other so that an output value of one neural network is used as an input value of another neural network. Examples of neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks.

In order to perform the above-described operation, the recognition unit may obtain target data. The target data may be obtained from the storage 16 or the server storage or from the outside. The target data may be data to be recognized by the neural network. Before applying the target data to the trained neural network, the recognition unit may perform the pre-processing operation on the obtained target data, or select data to be used for recognition from among a plurality of target data. For example, the recognition unit may process or filter the target data in a predetermined format, or add/remove noise to process data in a form suitable for recognition. The recognition unit may obtain an output value output from the neural network by applying the preprocessed target data to the neural network. The recognition unit may obtain a probability value or a reliability value along with the output value.

Figure 3:
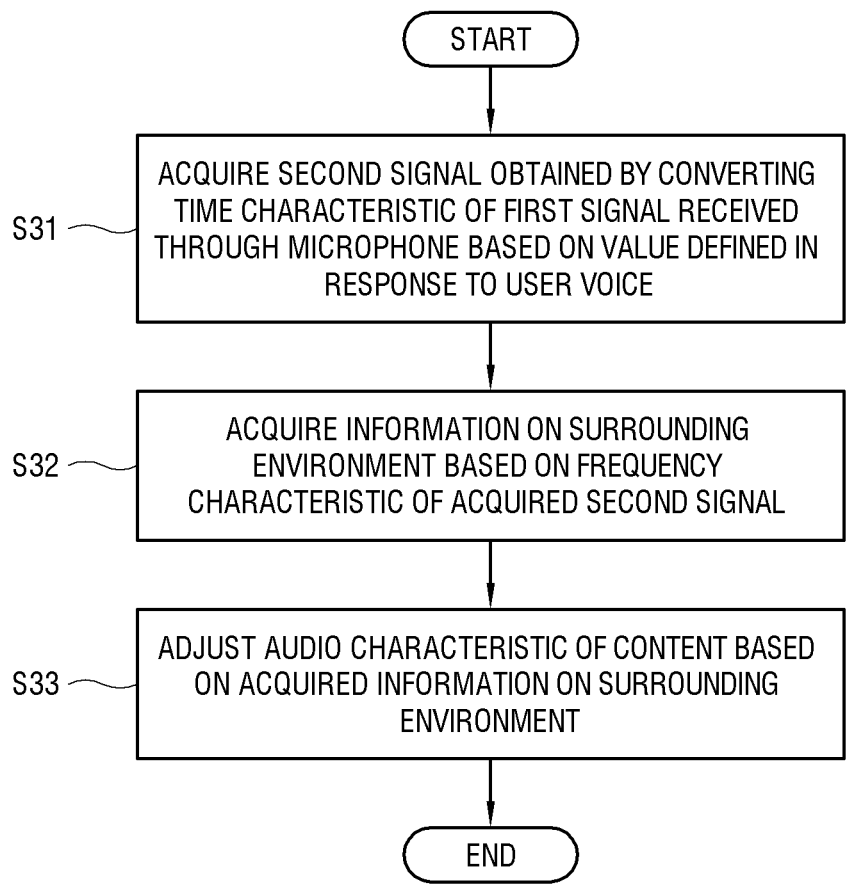
FIG. 3 is a flowchart illustrating an example method of controlling the electronic device of FIG. 1 according to various embodiments.

FIG. 3 is a flowchart illustrating an example method of controlling an electronic device of FIG. 1 according to various embodiments.

Each operation of FIG. 3 may be executed by the processor 6 of the electronic device 1.

The processor 6 may acquire the second signal obtained by converting the time characteristic of the first signal received through the microphone 17 based on a value defined corresponding to the user voice (S31).

The processor 6 may acquire information on the surrounding environment based on the frequency characteristic of the acquired second signal (S32).

The processor 6 may adjust the audio characteristic of the content based on the acquired information on the surrounding environment (S33).

In this example, the information on the surrounding environment is acquired from the second signal obtained by converting the time characteristic of the first signal, and thus the listening environment may be improved by adjusting the audio characteristic with the signal received through the microphone and the security processing may be performed to prevent the significant personal information from being extracted from the first signal.

Figure 4:
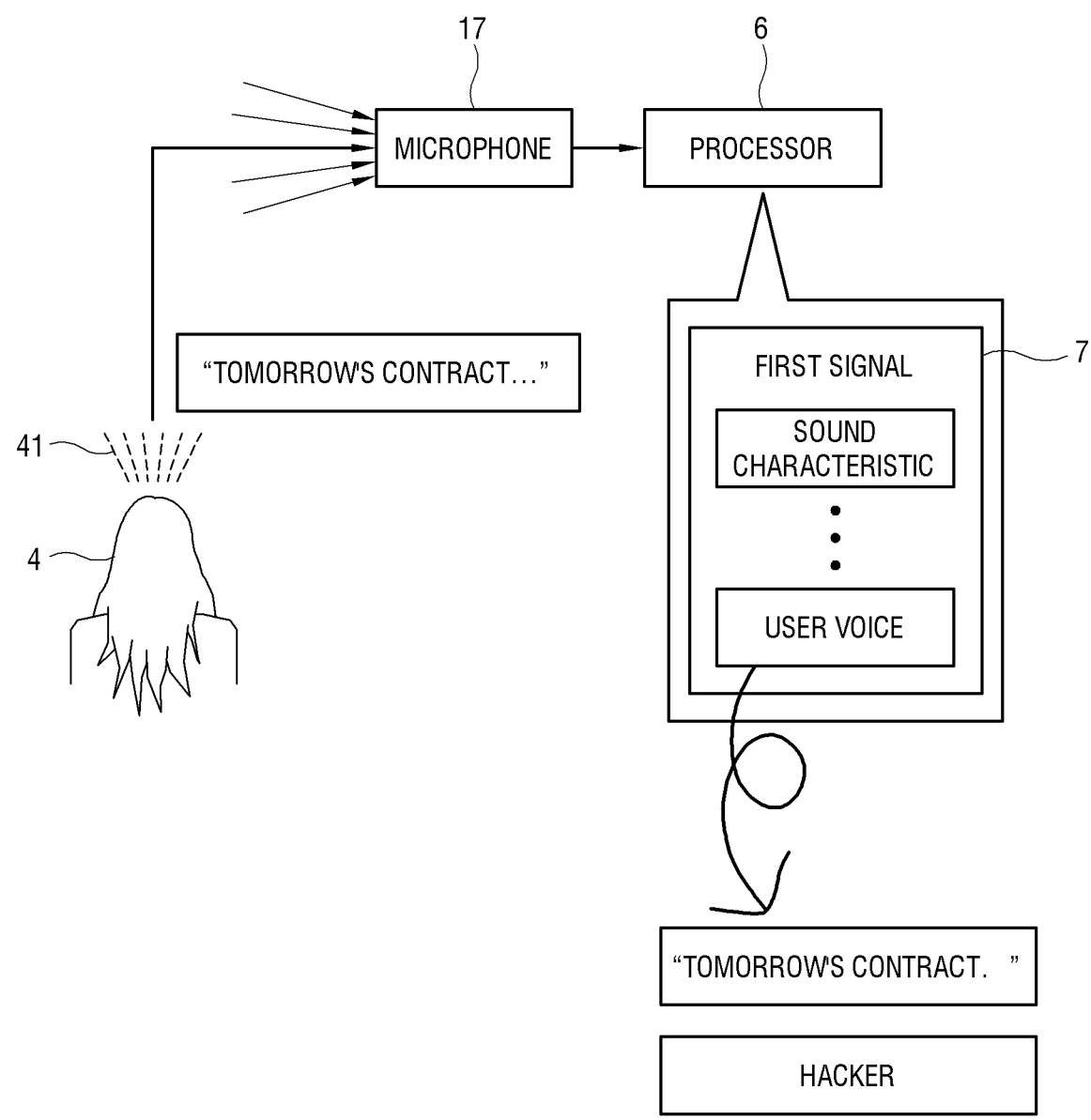
FIG. 4 is a diagram illustrating an example of receiving a first signal through a microphone in relation to operation S31 of FIG. 3 according to various embodiments.

FIG. 4 is a diagram illustrating an example of receiving a first signal through a microphone in relation to operation S31 of FIG. 3 according to various embodiments.

As illustrated in FIG. 4, the processor 6 may receive a first signal 7 through the microphone 17. The first signal 7 may be related to sound received through the microphone 17. For example, when the sound of the surrounding environment and user's utterance 41 from the user 4 are received through the microphone 17, the first signal 7 may include sound characteristics regarding the sound of the surrounding environment, the user voice regarding the user utterance 41, and the like.

The processor 6 may perform sound processing on the first signal 7 and may perform an operation according to the performed sound processing. As an example, the processor 6 may acquire the information on the surrounding environment according to a result of sound processing for the first signal 7 and identify the characteristics of the surrounding environment based on the acquired information. The characteristics of the surrounding environment may include, for example, not only the structure, shape, and presence of obstacles of the surrounding environment, but also whether the sound characteristics are changed, the degree of change, or the like. The processor 6 may adjust, for example, the output characteristics of the audio 5 with the operation based on the identified characteristics of the surrounding environment.

However, when a hacker penetrates into the processor 6 and hacks the first signal 7, the personal information may be indiscriminately collected from the user's voice included in the first signal 7. When the user 4 utters "Tomorrow's contract . . . " in relation to an important contract to be concluded tomorrow, the information on the contract may be collected by the hacker from the user voice of the first signal 7. When the always-on function of always activating the activated microphone 17 is used, the personal information may be always exposed to the outside.

Therefore, even if a signal is leaked, there is a need for a method for performing security processing so that the significant personal information is not extracted from the first signal 7. In the following, by acquiring the second signal 9 (refer to FIG. 5) obtained by converting the time characteristic of the first signal 7 with reference to FIG. 5 and the like, the process of preventing the significant personal information from being extracted from the second signal 9 even if the signal leaks will be described in greater detail below.

Figure 5:
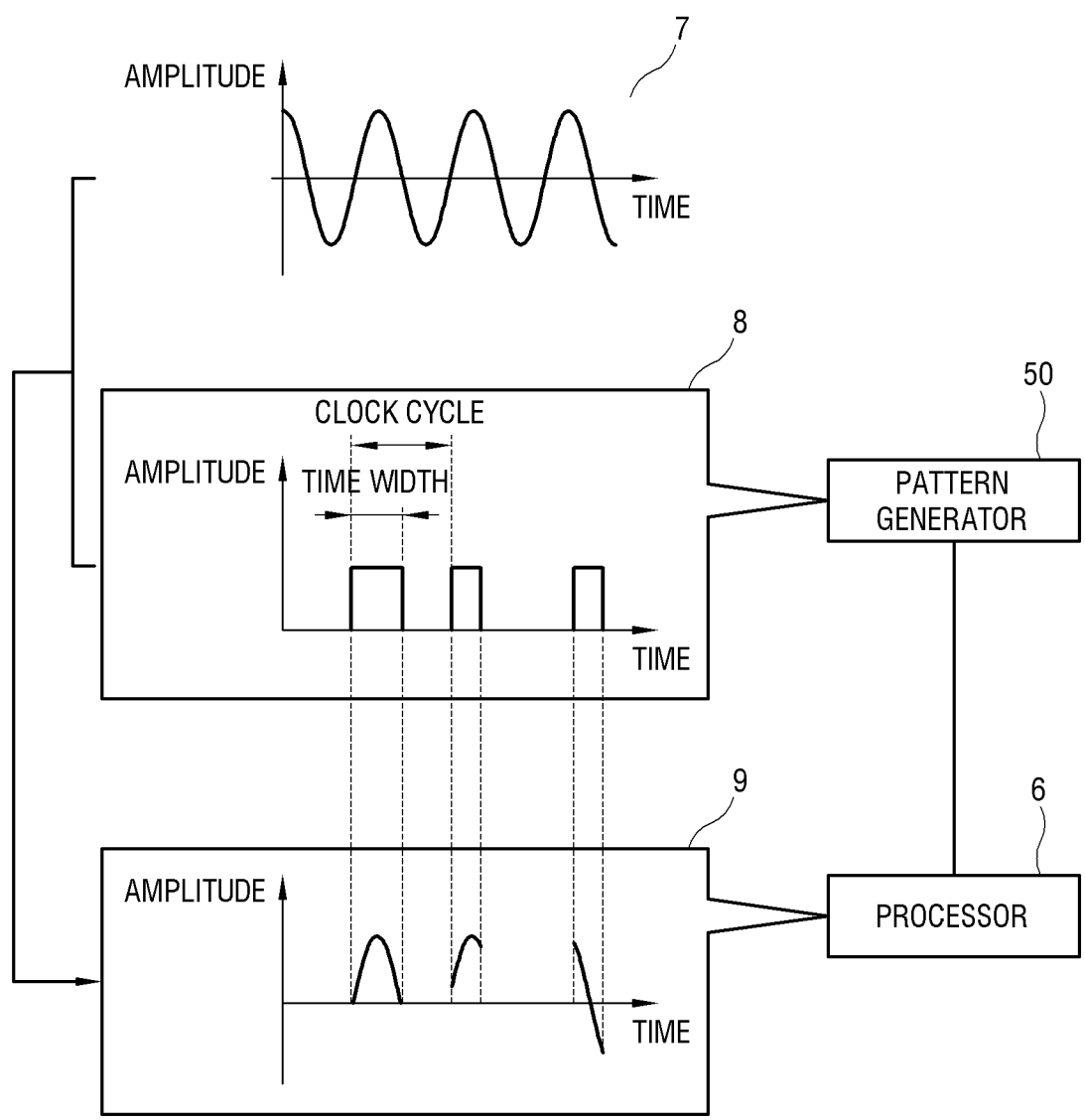
FIG. 5 is a diagram illustrating an example of acquiring a second signal obtained by converting a time characteristic of the first signal in relation to the operation S31 of FIG. 3 according to various embodiments.

FIG. 5 is a diagram illustrating an example of acquiring a second signal obtained by converting a time characteristic of the first signal in relation to the operation S31 of FIG. 3 according to various embodiments.

As illustrated in FIG. 5, the processor 6 may receive the first signal 7 through the microphone 17. Since a waveform of the first signal 7 is not limited to that illustrated in FIG. 5, the first signal 7 may have various types of waveforms. However, hereinafter, for convenience of explanation, it is assumed that the first signal 7 has the waveform of FIG. 5.

The processor 6 may perform conversion processing for converting the time characteristic of the first signal 7. The conversion processing may include a process of converting the time characteristic of the first signal 7 to acquire the second signal 9 having the converted time characteristic. As an example of the conversion processing, the processor 6 may combine the first signal 7 and the third signal 8. The third signal 8 may include a clock signal having a predetermined clock. The clock of the third signal 8 may refer to a timing referenced when the processor 6 performs various processing. As an example, the clock of the third signal 8 may be based on various timings such as synchronization timing for synchronizing the video signal and the audio signal, and external communication timing for wired or wireless communication with the external device, but is not limited thereto.

The processor 6 may segment the first signal 7 into a plurality of intervals in a time domain according to the clock of the third signal 8 and acquire the second signal 9 including the plurality of segmented intervals. The segment shape of the second signal 9 may vary according to the clock characteristic of the third signal 8. The clock characteristics may include the time width, the cycle, or the like of the clock. For example, when the clock of the third signal 8 has a predetermined time width, the second signal 9 may have a form of a signal that includes a portion of the first signal 7 corresponding to the predetermined time width and excludes the remaining portions. If the time width is irregular for each clock, the second signal 9 may be configured in a form having irregular intervals.

In addition, when the clock of the third signal 8 has a predetermined cycle, the second signal 9 may have a form of a signal including a portion of the first signal 7 corresponding to the above-described time width every predetermined cycle. When the cycle is irregular for each cycle, the second signal 9 may be configured in a form having an interval corresponding to the above-described time width at an irregular cycle.

The clock characteristics of the third signal 8 may have a value defined for the user utterance. The value defined for the user utterance may include a time limit to prevent the user utterance 41 from the second signal 9 from being recognized, and the processor 6 may reflect the time to limit the recognition of the user utterance 41 to the clock characteristics of the third signal 8. In the example described with reference to FIG. 4 above, when the user voice of the user utterance 41 that is the "tomorrow's contract . . . " is included in the first signal 7, the processor 6 may set the time width, the cycle, or the like of the third signal 8 so that the "tomorrow", the "contract", and major words, syllables, and the like related to the contract are not recognized. The time width, the cycle, or the like of the third signal 8 may be variously set according to the design method.

In this example, the processor 6 may acquire the second signal 9 in which the conversion processing is performed on the time characteristic of the first signal 7, and since the converted second signal 9 is segmented, for example, to a level where the user utterance 41 may not be recognized, it is possible to prevent the significant personal information from being extracted from the second signal 9 even if the signal is leaked.

Figure 6:
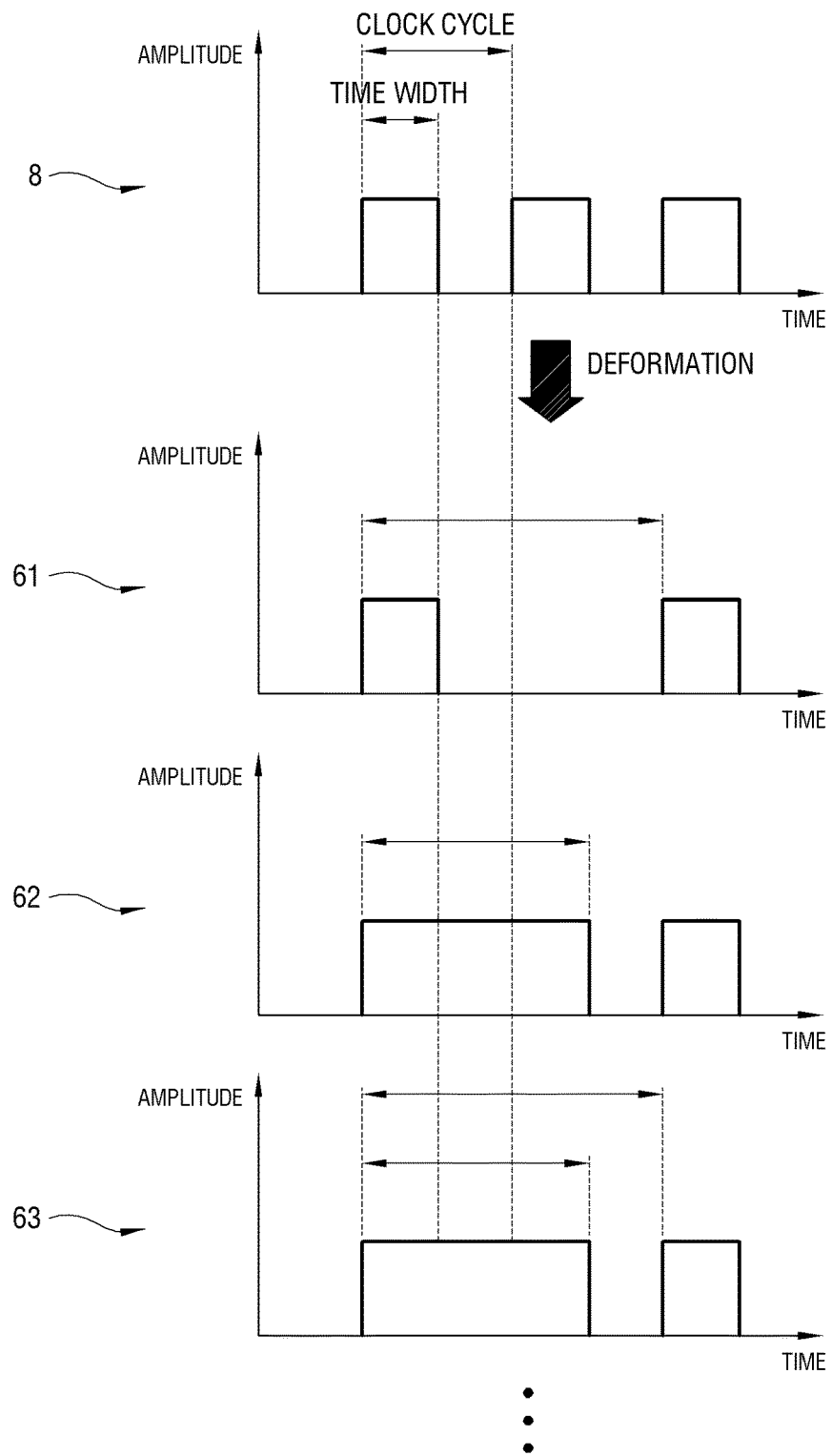
FIG. 6 is a diagram illustrating various examples of a third signal in relation to the operation S31 of FIG. 3 according to various embodiments.

FIG. 6 is a diagram illustrating various examples of a third signal in relation to the operation S31 of FIG. 3 according to various embodiments. As described above with reference to FIG. 5, the third signal 8 may include a clock having a predetermined time width, and the clock may be repeated at a predetermined clock cycle.

The processor 6 may perform deformation processing on the clock of the third signal 8. The deformation processing may include a process of deforming at least one of a cycle or a time width of a clock. For example, the processor 6 may perform the deformation processing in response to the change of the user 4. The processor 6 may identify the user 4 from the user utterance 41, and when it is identified that there is a change in the user 4, it is possible to perform the deformation processing on the time width of the clock, and the like in consideration of the changed voice of the user 4. However, since the disclosure is not limited to identifying the user 4 based on the user utterance 41, the processor 6 may recognize the user 4 through the camera.

As an example of the deformation processing with reference to FIG. 6, the processor 6 may generate a third signal 61 having a clock cycle longer than that of the third signal 8. However, since the disclosure is not limited thereto, the clock cycle of the third signal 61 may be generated to be further reduced or may be generated randomly.

As another example, the processor 6 may generate a third signal 62 having a time width longer than that of the third signal 8. However, since the disclosure is not limited thereto, the time width of the third signal 62 may be generated to be further reduced or may be generated randomly.

As another example, the processor 6 may generate a third signal 63 having a time width and a clock cycle longer than those of the third signal 8. However, since the disclosure is not limited thereto, the degree of modification of the time width and clock cycle of the third signal 63 may be variously set according to the design method.

In this example, since the processor 6 may variously modify the time width and clock cycle of the third signal, it is possible to secure diversity of the second signal 9 acquired by the combination with the first signal 7. Accordingly, the processor 6 may enhance security processing for personal information leakage.

As described above with reference to FIG. 5, when the clock is not suitable as the time corresponding to the recognition limit of the user utterance 41, since the processor 6 may adjust the time width, the cycle, or the like of the third signal 8 through the above-described deformation processing to match the time corresponding to the recognition limit of the user utterance 41, the processor 6 may further enhance the security processing for the personal information leakage.

Figure 7:
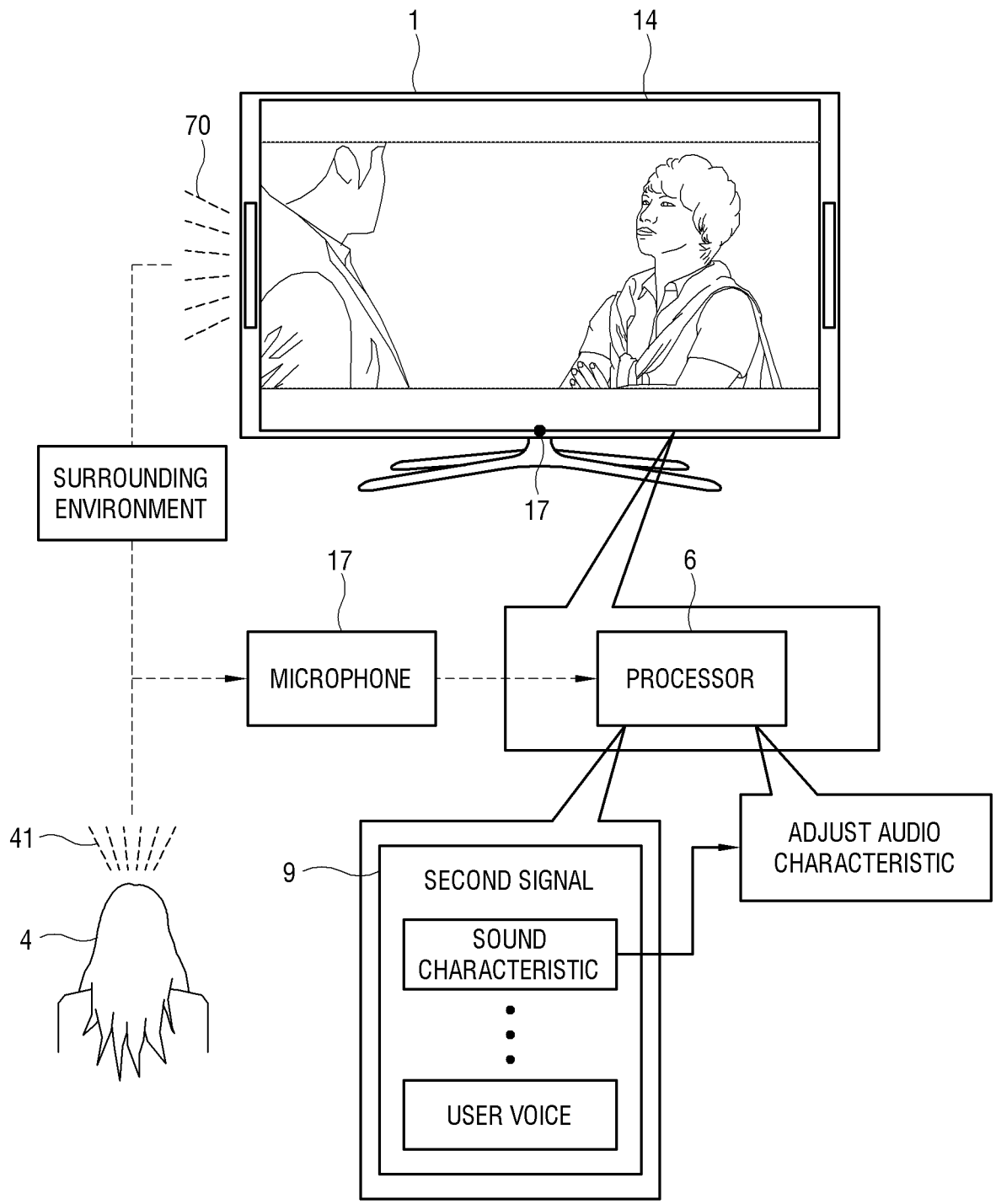
FIG. 7 is a diagram illustrating an example of acquiring information on surrounding environment based on a second signal in relation to operation S32 of FIG. 3 according to various embodiments.

FIG. 7 is a diagram illustrating an example of acquiring information on surrounding environment based on a second signal in relation to operation S32 of FIG. 3 according to various embodiments.

As illustrated in FIG. 7, the processor 6 may output sound 70 through the speaker 18 based on the sound signal. The sound 70 may include a test sound 70 that is output based on a test sound signal for measuring the characteristics of the surrounding environment.

The processor 6 may receive the first signal 7 (refer to FIG. 4) corresponding to the test sound 70 through the microphone 17. As described above with reference to FIG. 5, when the first signal 7 includes the sound characteristics of the surrounding environment, the processor 7 may acquire the second signal 9 according to the conversion processing on the first signal 7.

The processor 6 may identify the characteristics of the surrounding environment based on the converted sound characteristics. For example, the processor 6 may identify the characteristics of the surrounding environment using the power spectrum. More specifically, the processor 6 may convert the sound characteristics into the power spectrum. As an example, the processor 6 may convert the sound characteristics into the power spectrum through Fast Fourier Transform (FFT). Since an X axis of the power spectrum may indicate a frequency and a Y axis thereof may indicate a square of amplitude, the processor 6 may acquire the frequency characteristic using the power spectrum. The frequency characteristic may include, for example, a frequency and the amplitude corresponding to the frequency.

The processor 6 may determine the characteristics of the surrounding environment based on the frequency characteristic acquired for each frequency band. The converted sound characteristics are segmented, but the processor 6 may identify the frequency characteristic in all intervals by band in consideration of the tendency that the frequency characteristic continues for a certain cycle of the corresponding band, and may identify the characteristics of the surrounding environment based on the identified frequency characteristic. However, since the method of identifying the characteristics of the surrounding environment based on the converted sound characteristics is not limited thereto, the characteristics of the surrounding environment may be identified in various ways according to the design method.

When the characteristics of the surrounding environment are identified, the processor 6 may adjust the characteristics of the audio 5 of the content based on the characteristics of the identified surrounding environment. For example, when it is identified that there is a tendency to attenuate the frequency due to the surrounding environment, the processor 6 may take this tendency into consideration and control the output frequency of the audio 5 to be amplified and output. The processor 6 can also identify whether there is a tendency to attenuate the frequency in a specific frequency band. In this case, the processor 6 may control the output frequency of the audio 5 to be amplified only for a specific frequency band. By allowing the output frequency to be amplified in advance in this way, the processor 6 may offset the frequency attenuation tendency by the surrounding environment.

In this example, since the processor 6 may self-identify the characteristics of the surrounding environment based on the test sound 70 and adjust the characteristics of the audio 5 based on the characteristics of the self-identified surrounding environment, it is possible to create the listening environment adaptively improved to the surrounding environment.

Figure 8:
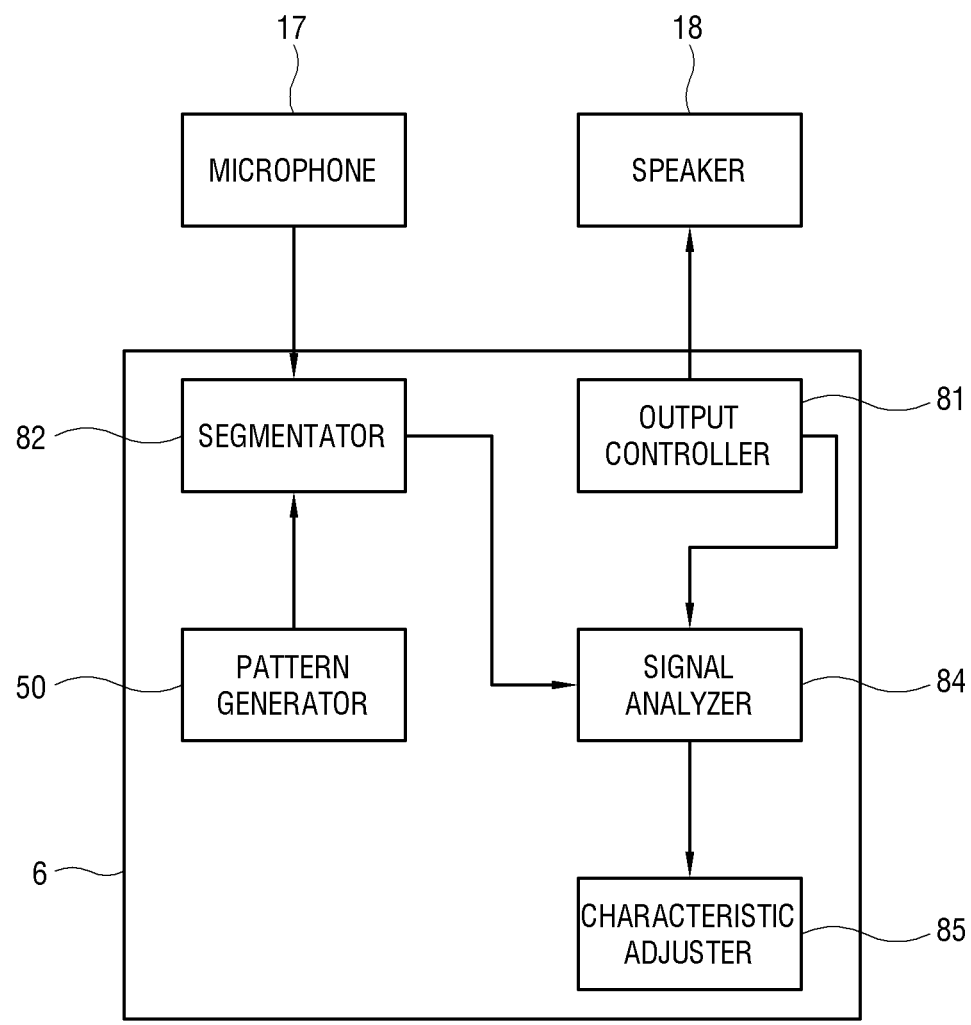
FIG. 8 is a block diagram illustrating an example configuration of a processor in relation to the operation S32 of FIG. 3 according to various embodiments.

FIG. 8 is a block diagram illustrating an example configuration of a processor in relation to the operation S32 of FIG. 3 according to various embodiments.

As illustrated in FIG. 8, the processor 6 may include an output controller (e.g., including processing circuitry and/or executable program elements) 81. The output controller 81 may output the test sound signal to the speaker 18 to cause the speaker 18 to output the test sound 70. The test sound signal may be based on data stored in the storage unit 16, but is not limited thereto, and thus may be received from the external device.

The processor 6 may include a segmentator (e.g., including processing circuitry and/or executable program elements) 82. When the first signal 7 of the test sound 70 is received through the microphone 17, the segmentator 82 may perform segmentation processing on the first signal 7, and acquire the segmented second signal 9. The second signal 9 may be configured as some of a plurality of intervals of the first signal 7 by segmentation processing.

The processor 6 may include a pattern generator (e.g., including processing circuitry and/or executable program elements) 50. The pattern generator 50 may generate a predetermined clock having a pattern. Here, the pattern may include a periodic or aperiodic pattern. The pattern generator 50 may transmit the third signal 8 having a predetermined clock to the segmentator 82, so that the segmentator 82 may refer to the predetermined clock of the third signal 8 when performing the segmentation processing on the first signal 7. In addition, the pattern generator 50 may set clock characteristics. The clock characteristics may include the time width, the cycle, or the like of the clock. For example, the pattern generator 50 may set the time width, the cycle, or the like of the clock so that the user utterance 41 may not be recognized from the second signal 9.

The signal analyzer (e.g., including processing circuitry and/or executable program elements) 84 may identify the characteristics of the surrounding environment based on the second signal 9 segmented by the segmentator 82. The signal analyzer 84 may identify the characteristics of the surrounding environment through the frequency analysis of the segmented second signal 9.

A characteristic adjuster (e.g., including processing circuitry and/or executable program elements) 85 may adjust the characteristics of the audio 5 of the content based on the characteristics of the surrounding environment. For example, when it is identified by the signal analyzer 84 that the characteristics of the surrounding environment have the frequency amplification tendency, the characteristic adjuster 85 may control the output frequency of the audio 5 to be attenuated and controlled when outputting the audio 5.

In this example, since the processor 6 may self-identify the characteristics of the surrounding environment based on the test sound 70 and adjust the characteristics of the audio 5 based on the characteristics of the self-identified surrounding environment, it is possible to create the improved listening environment that adapts to the surrounding environment.

Figure 9:
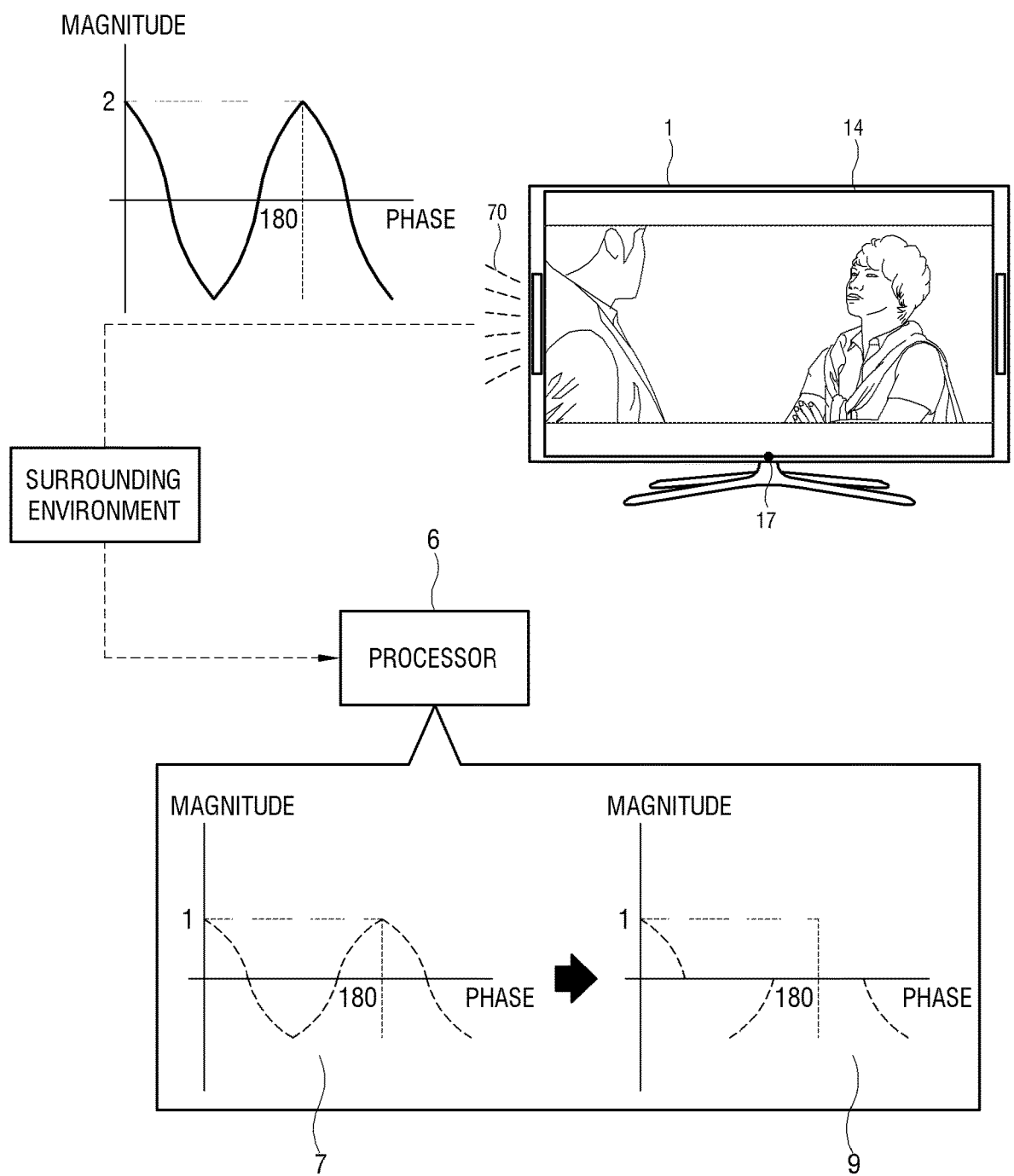
FIG. 9 is a diagram illustrating an example of acquiring information on surrounding environment based on a frequency characteristic of the second signal in relation to the operation S32 of FIG. 3 according to various embodiments.

FIG. 9 is a diagram illustrating an example of acquiring information on surrounding environment based on a frequency characteristic of the second signal in relation to the operation S32 of FIG. 3 according to various embodiments.

As illustrated in FIG. 9, the processor 6 may output the test sound 70 based on the test sound signal, and convert the first signal 7 including the sound characteristics corresponding to the test sound 70 into the segmented second signal 9. The converted second signal 9 may include the segmented sound characteristics.

The processor 6 may identify the characteristics of the surrounding environment by comparing the frequency characteristic between the test sound signal and the second signal 9. For example, the processor 6 may identify that a peak value of the test sound signal is "2" in the frequency domain, and the peak value of the segmented sound characteristics is "1". In light of this comparison result, the processor 6 may identify that the characteristics of the surrounding environment have the frequency attenuation tendency.

On the other hand, since the sound characteristics are segmented, the peak value may not be directly identified. Even in such a case, the processor 6 may identify that the peak value of the sound characteristic is "1", for example, in the frequency domain in consideration of the tendency for the frequency characteristic to repeat or persist.

In this example, the processor 6 may self-identify the characteristics of the surrounding environment in consideration of the frequency characteristic of the second signal 9, so even if it cannot directly identify the characteristics of the surrounding environment from the second signal 9, it is possible to create the listening environment adaptively improved to the surrounding environment.

Figure 10:
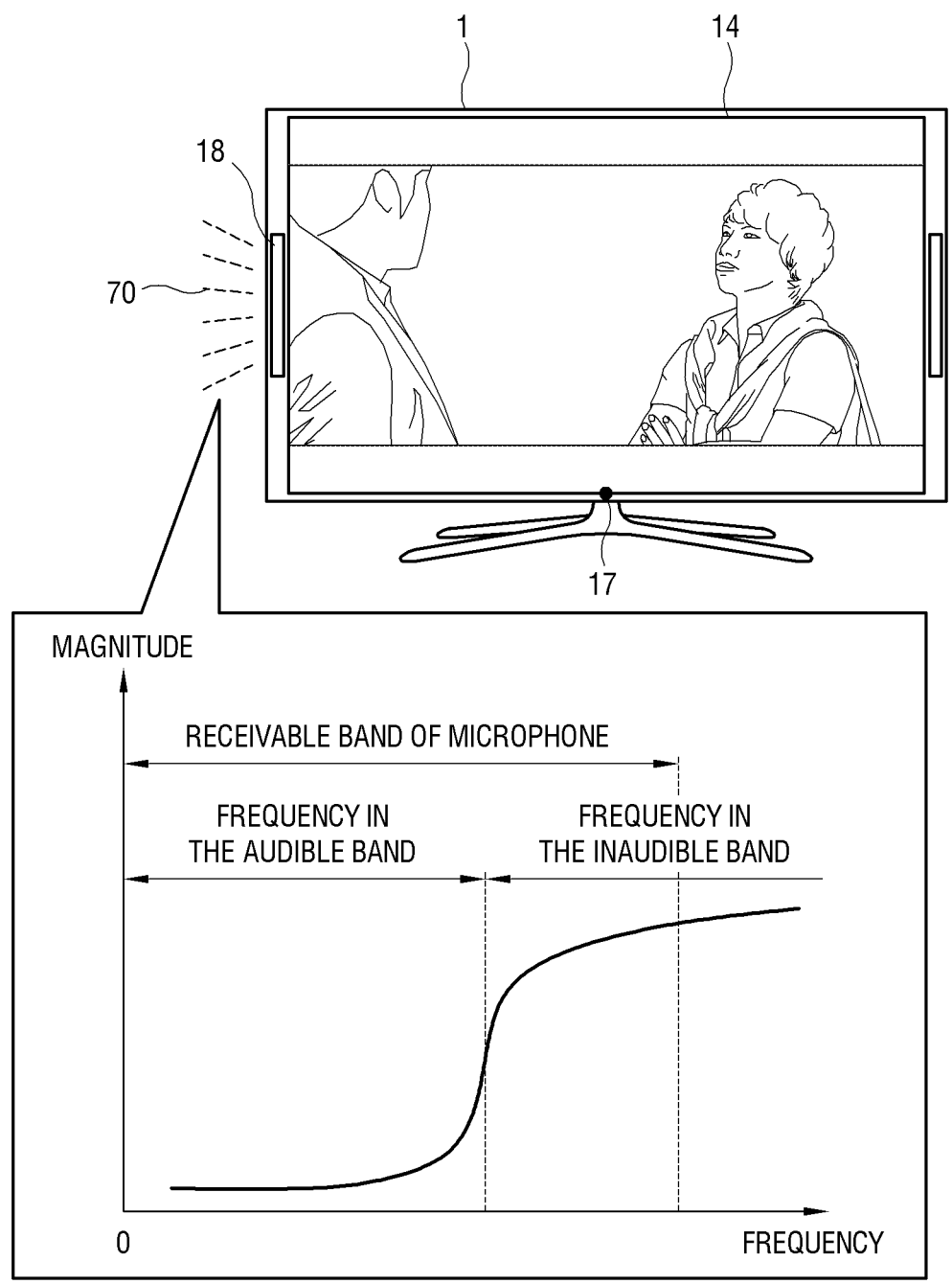
FIG. 10 is a diagram illustrating an example of outputting a sound in an ultra-high frequency band in relation to the operation S32 of FIG. 3 according to various embodiments.

FIG. 10 is a diagram illustrating an example of outputting a sound in an ultra-high frequency band in relation to the operation S32 of FIG. 3 according to various embodiments.

As illustrated in FIG. 10, when the processor 6 may consider the frequency band of the test sound 70 when outputting the test sound 70.

The processor 6 may output the test sound 70 in the inaudible frequency band. The test sound 70 in the inaudible frequency band may be output at a predetermined period or aperiodically. In addition, the processor 6 may output the test sound 70 in the inaudible frequency band. If it is identified that the user 4 is not in the vicinity of the electronic device 1, the processor 6 may output the test sound 70 in the audible frequency band. Similarly, the test sound 70 in the inaudible frequency band may be output at a predetermined period or aperiodically.

However, since the disclosure is not limited to outputting the test sound 70 of any one frequency band, the processor 6 may simultaneously or sequentially output the test sound 70 of the inaudible frequency band and the audible frequency band.

In this example, the processor 70 may output the test sound 70 in the inaudible frequency band, so that the test sound 70 does not cause inconvenience or discomfort to the user 4, and the characteristics of the surrounding environment may not self-identified.

Figure 11:
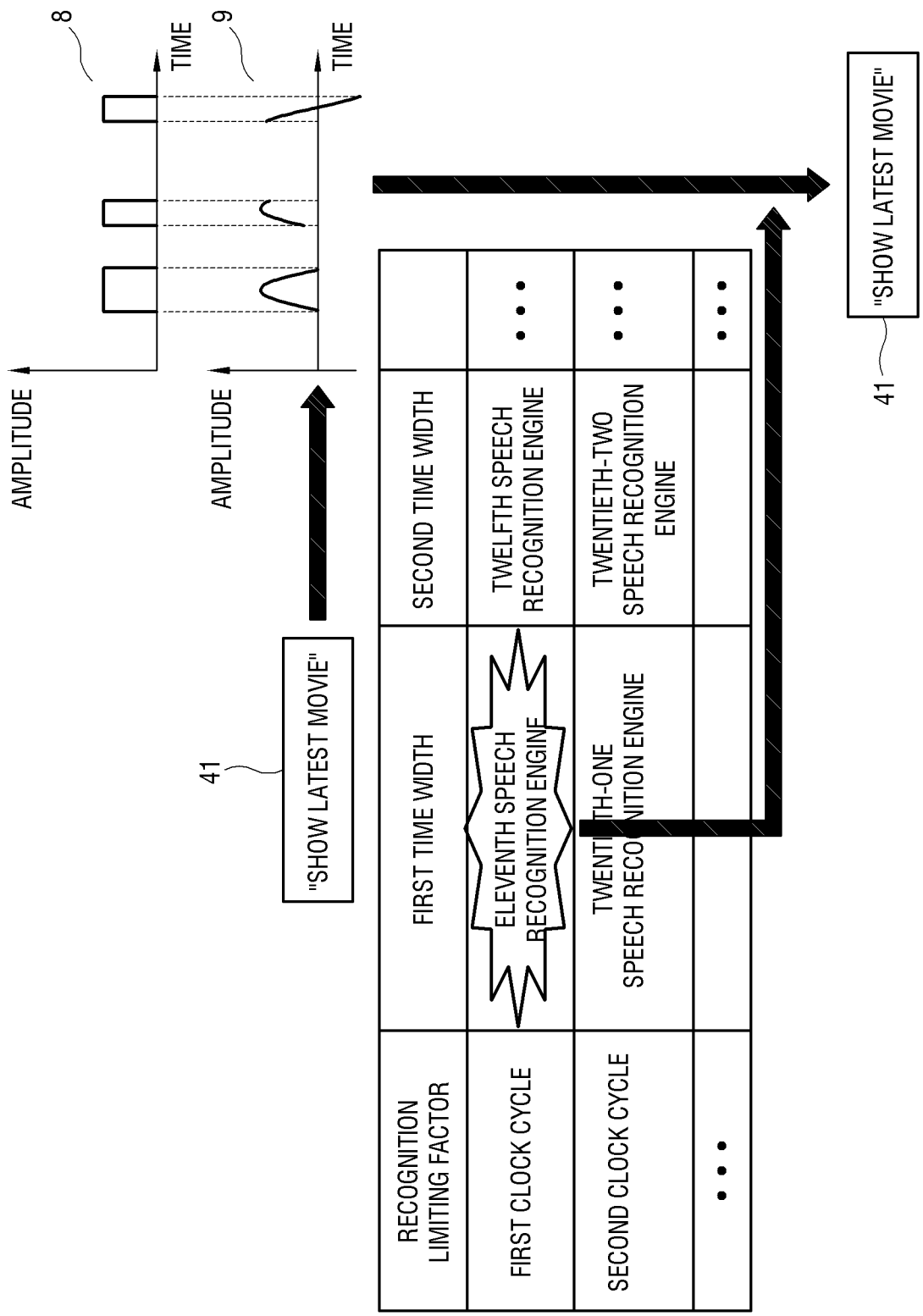
FIG. 11 is a diagram illustrating an example of performing speech recognition on the second signal according to various embodiments.

FIG. 11 is a diagram illustrating an example of performing speech recognition on the second signal according to various embodiments.

As described above with reference to FIG. 5, the processor 6 provides the second signal 9 in the segmented form, so that even if the signal is leaked, the significant personal information may not be obtained from the second signal 9. However, as a result of segmenting the user voice corresponding to the user utterance 41 by the segmentation processing to a level that prevents the user utterance 41 from being recognized, for example, when the user utterance 41 is a voice command, the speech recognition for the user utterance 41 may become impossible. For example, in the case where the user utterance 41 is "show latest movie", when the segmentation processing is performed, it is recognized as a voice such as "d . . . d . . . d . . . ", a situation arises in which it may not be possible to grasp the utterance intention of the user 4 to show the latest movie.

In consideration of this problem, the processor 6 may identify a speech recognition engine corresponding to the clock characteristic, and apply the identified speech recognition engine, thereby enabling the speech recognition for the user utterance 41. The speech recognition engine may include a hardware/software component used for speech recognition processing for a voice signal according to the user utterance 41. The speech recognition engine may include a speech recognition program, a speech recognition model, and the like, and the speech recognition program may be provided in the form of an application.

The processor 6 may prepare a plurality of speech recognition engines for each recognition limiting factor in advance. The recognition limiting factor may include the cycle, the time width, or the like of the clock. The speech recognition engine may be provided in the storage 16 or may be received from the external device. In addition, hereinafter, for convenience of explanation, it is assumed that the speech recognition processing by the speech recognition engine is executed by the processor 6, but is not limited thereto, and thus at least part of the processes of speech recognition processing may be performed by an external server through the network.

Referring to FIG. 11, for example, when the third signal 8 has a first clock cycle and a first time width, the processor 6 may identify the first clock cycle and the first time width of the user voice of the second signal 9. The processor 6 may receive the information on the first clock cycle and the first time width of the third signal 8 from the pattern generator 50 to identify the first clock cycle and the first time width of the user voice of the second signal 9.

The processor 6 may identify an eleventh speech recognition engine corresponding to the previously identified first clock cycle and first time width from among a plurality of speech recognition engines previously prepared for each clock cycle and time width. The processor 6 may perform the speech recognition processing or the like on the user voice having the first clock cycle and the first time width based on the eleventh speech recognition engine. In this example, the processor 6 may perform the speech recognition on the user voice based on the speech recognition engine corresponding to each clock cycle and time width for each interval of the second signal 9. For example, even if the clock cycle and the time width of the second signal 9 change irregularly, the processor 6 may identify the clock cycle and the time width that change irregularly, and perform speech recognition based on the corresponding speech recognition engine.

In this example, the processor 6 may identify the speech recognition engine based on the recognition limiting factor, and perform the speech recognition on the user voice of the second signal 9 based on the identified speech recognition engine, thereby performing the speech recognition meeting the intention of the user 4 even if the segmentation processing is performed on the signal 9.

Various embodiments disclosed in the disclosure may be implemented as software including one or more instructions stored in a storage medium that may be read by a machine such as the electronic device 1. For example, the processor 6 of the electronic device 1 may call and execute at least one instruction among one or more instructions stored from the storage medium. This makes it possible for a device such as the electronic device 1 to be operated to perform at least one function according to the at least one command called. The one or more instructions may include codes generated by a compiler or codes executable by an interpreter. The machine-readable storage medium may be provided in a form of a non-transitory storage medium. The 'non-transitory' storage medium is a tangible device, and may not include a signal (for example, electromagnetic waves), and the term does not distinguish between the case where data is stored semi-permanently on a storage medium and the case where data is temporarily stored thereon. For example, the 'non-transitory storage medium' may include a buffer in which data is temporarily stored.

According to an embodiment, the methods according to the various example embodiments disclosed in the disclosure may be included and provided in a computer program product. The computer program product according to the disclosure may include instructions of software executed by a processor, as described above. The computer program product may be traded as a product between a seller and a purchaser. The computer program product may be distributed in the form of a machine-readable storage medium (for example, CD-ROM), or may be distributed (for example, download or upload) through an application store (for example, Play Store™) or may be directly distributed (for example, download or upload) between two user devices (for example, smartphones) online. In case of the online distribution, at least a portion of the computer program product (for example, downloadable app) may be at least temporarily stored in a storage medium such as a memory of a server of a manufacturer, a server of an application store, or a relay server or be temporarily generated.

While the disclosure has been illustrated and described with reference to various example embodiments, it will be understood that the various example embodiments are intended to illustrative, not limiting. It will be further understood by one of ordinary skill in the art that various changes in form and detail may be made without departing from the true spirit and full scope of the disclosure, including the appended claims and their equivalents.

What is claimed is:

1. An electronic device, comprising:
a processor configured to:
acquire a second signal obtained by converting a time characteristic of a first signal received through a microphone, wherein the acquiring of the second signal includes combining the first signal and a third signal generated to restrict recognition of a user voice and removing at least one interval of the first signal corresponding to at least one interval of the third signal from among a plurality of intervals of the first signal,
acquire information on a surrounding environment based on a frequency characteristic of the acquired second signal, and
adjust an audio characteristic of content based on the acquired information on the surrounding environment.

2. The electronic device of claim 1, wherein the third signal is a signal having a predetermined time width repeated at a predetermined clock cycle.

3. The electronic device of claim 1, wherein the third signal is a clock signal having a timing based on external wired or wireless communication timing.

4. The electronic device of claim 1, wherein the time corresponding to the recognition restriction includes at least one of a cycle or a time width, and the processor is configured to adjust at least one of a cycle or a time width of the third signal.

5. The electronic device of claim 1, wherein the processor is configured to control the electronic device to output a sound for measuring the surrounding environment through a speaker, and to receive the first signal through the microphone in response to the output of the sound.

6. The electronic device of claim 5, wherein the sound has a frequency higher than an audible frequency.

7. The electronic device of claim 1, wherein the processor is configured to acquire the information on the surrounding environment based on a peak value for each frequency band of the acquired second signal.

8. The electronic device of claim 1, wherein the processor is configured to perform speech recognition on the second signal based on a time corresponding to recognition restriction.

9. A method of controlling an electronic device, comprising:
acquiring a second signal obtained by converting a time characteristic of a first signal received through a microphone, wherein the acquiring of the second signal includes combining the first signal and a third signal generated to restrict recognition of a user voice and removing at least one interval of the first signal corresponding to at least one interval of the third signal from among a plurality of intervals of the first signal;
acquiring information on a surrounding environment based on a frequency characteristic of the acquired second signal; and adjusting an audio characteristic of content based on the acquired information on the surrounding environment.

10. The method of claim 9, wherein the third signal is a signal having a predetermined time width repeated at a predetermined clock cycle.

11. The method of claim 9, wherein the third signal is a clock signal having a timing based on external wired or wireless communication timing.

12. The method of claim 9, wherein the time corresponding to the recognition restriction includes at least one of a cycle or a time width, and the acquiring of the second signal segmented from the first signal includes adjusting at least one of a cycle or a time width of the third signal.

13. The method of claim 9, further comprising:
outputting a sound for measuring the surrounding environment through a speaker; and
receiving the first signal through the microphone in response to the output of the sound.

14. The method of claim 13, wherein the sound has a frequency higher than the audible frequency.

15. The method of claim 9, wherein the acquiring of the information on the surrounding environment includes acquiring the information on the surrounding environment based on a peak value for each frequency band of the acquired second signal.

16. The method of claim 9, further comprising:
performing speech recognition on the second signal based on the time corresponding to the recognition restriction.

17. A non-transitory computer-readable recording medium having stored thereon a computer program including a code which when executed by a processor of an electronic device causes the electronic device to perform operations including:
acquiring a second signal obtained by converting a time characteristic of a first signal received through a microphone, wherein the acquiring of the second signal includes combining the first signal and a third signal generated to restrict recognition of a user voice and removing at least one interval of the first signal corresponding to at least one interval of the third signal from among a plurality of intervals of the first signal;
acquiring information on a surrounding environment based on a frequency characteristic of the acquired second signal; and
adjusting an audio characteristic of content based on the acquired information on the surrounding environment.

18. The non-transitory computer-readable recording medium of claim 17, wherein the third signal is a signal having a predetermined time width repeated at a predetermined clock cycle.

19. The non-transitory computer-readable recording medium of claim 17, wherein the third signal is a clock signal having a timing based on external wired or wireless communication timing.

20. The non-transitory computer-readable recording medium of claim 17, wherein the time corresponding to the recognition restriction includes at least one of a cycle or a time width, and the acquiring of the second signal segmented from the first signal includes adjusting at least one of a cycle or a time width of the third signal.

* * * * *